United States Patent [19]
Sheldon et al.

[11] 3,963,332
[45] June 15, 1976

[54] 3 DIMENSION PROJECTOR

[76] Inventors: Stewart L. Sheldon, 19 Nona Drive; Wilbur R. Horstman, 6 W. Sherry Drive; Robert G. Gump, 506 W. Sherry Drive, all of Trotwood, Ohio 45426

[22] Filed: May 8, 1972

[21] Appl. No.: 251,082

[52] U.S. Cl. .................................................. 352/60
[51] Int. Cl.² ........................................... G03B 35/08
[58] Field of Search ............................... 352/57, 60

[56] References Cited
UNITED STATES PATENTS 1,472,608  10/1923  MacBeth ............................. 352/57
1,550,214  8/1925   Leonard .............................. 352/60
1,559,893  11/1925  Lane ................................ 352/60 X
2,996,949  8/1961   LeRay ............................... 352/60

*Primary Examiner*—Monroe H. Hayes
*Attorney, Agent, or Firm*—Jerome P. Bloom

[57] ABSTRACT

A photographic method and system for achieving three dimensional projection in which separately recorded right and left eye images are projected toward a viewing surface in a superposing relation. Intermediately disposing shutter means cause the right and left eye images to be cast on the viewing surface in a timed space relation, in differential increments, and with relatively high frequency interruption.

5 Claims, 7 Drawing Figures

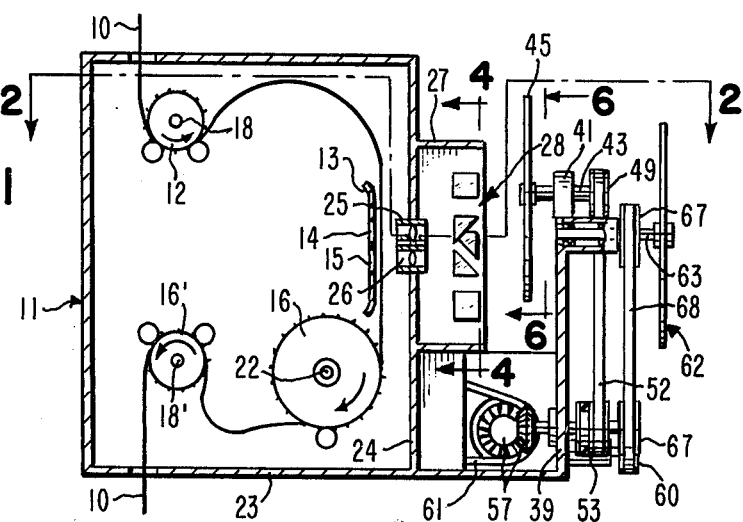
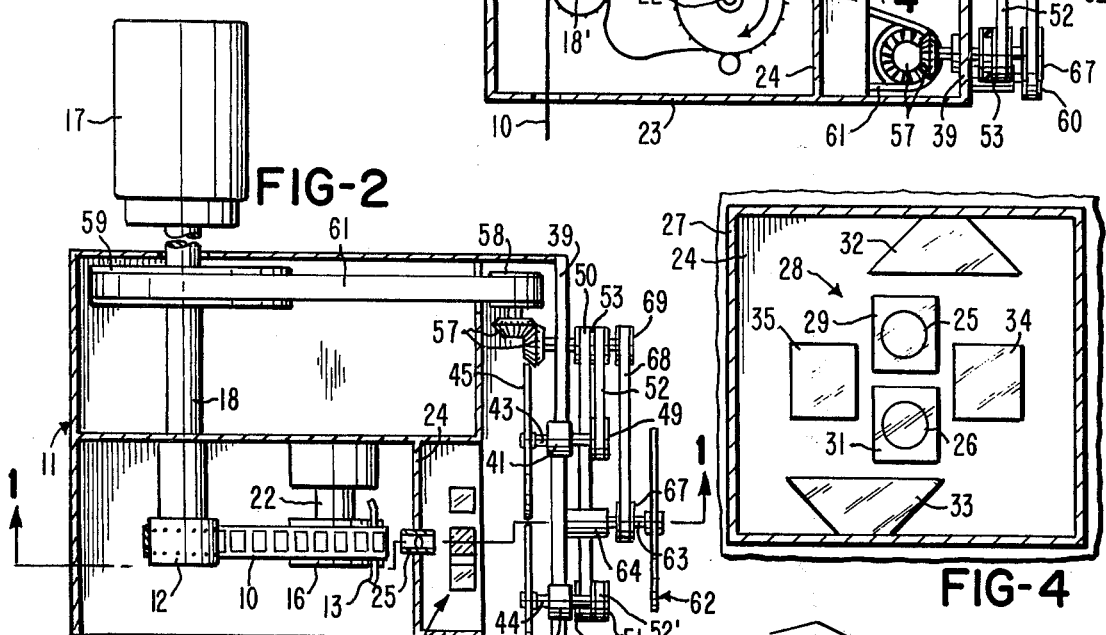
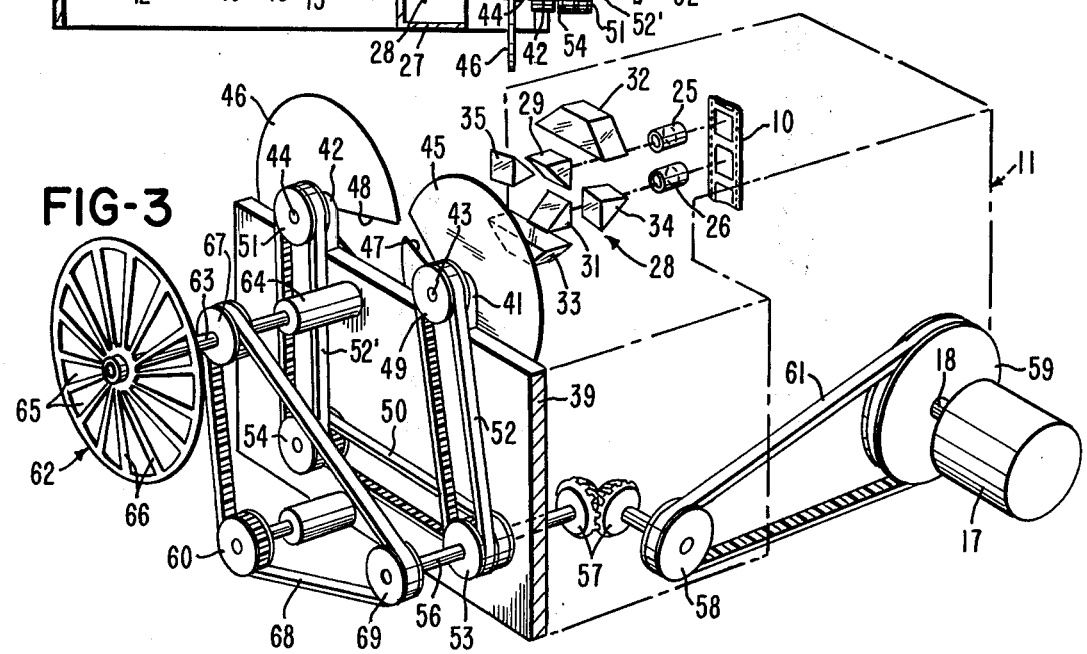

3 DIMENSION PROJECTOR

BACKGROUND OF THE INVENTION

This invention relates to three dimensional photographic projection systems and particularly to systems utilizing a principle of right and left eye image projection, with interposed shutter means so controlling the projected images as materially to enhance the illusion of depth produced in the eyes of a viewer.

A photographic system of the prior art projects right and left eye images and uses a shutter means for alternating the projected image. The system has limited features of control, however, offering correspondingly less opportunity for improvement in the depth and clarity of the projected picture. Further, the prior art system is not specifically designed for ease and flexibility of manufacture. Its results, while satisfactorily displaying the merits of involved principles, may not rise in all respects to a commercially acceptable level.

SUMMARY OF THE INVENTION

The present invention is based upon and uses principles of the prior art system. It provides, however, for a structural reorganization of the parts simplifying manufacturing procedures and allowing for a relocating of lens and other elements and for modification of other system components. It contemplates further projection methods and means in accordance with which right and left eye images are cast on a viewing surface in alternating relation and in repetitive manner, a concept of differential exposure time and areas being used. Further in the projection method and system a new element is introduced in the form of an additional shutter, common to both projected images and imposing thereon relatively high frequency interruption. The underlying scientific causes for improvement due to use of the additional shutter are not readily explainable. Demonstrably advantageous results flow therefrom, however, with the additional shutter uniquely combining with other elements of the system to produce projected three dimensional pictures of excellent quality and effect.

An object of the invention is to provide a method and apparatus for projecting pictures utilizing a novel combination of image transmitting and shutter devices to achieve high quality three dimensional imagery.

Another object of the invention is to provide shutter controls in which shutter openings intersect right and left eye images in a timed spaced manner and in a differential mode of traversal.

A further object of the invention is to introduce a superposing form of shutter control in which image projection through primary shutter devices are subjected to further interruption, an additional shutter device accomplishing a blending of projected images to produce a picture of superior depth and clarity.

Still another object of the invention is to provide synchronous, unison drive of a film strip and shutter mechanisms to achieve selected multiple image projection during each interval that successive film portions are at a projecting position.

A still further object of the invention is to provide primary shutter means in the form of a pair of shutter devices, one for each of the right and left eye images, the shutters rotatable in the path of respective projected images and having openings therein of differential circumferentially spaced position and differential size.

With the above and other incidental objects in view as will more fully appear in the specification, the invention intended to be protected by Letters Patent consists of the method, the features of construction, the parts and combinations thereof, and the mode of operation as hereinafter described or illustrated in the accompanying drawings, or their equivalents.

BRIEF DESCRIPTION OF THE DRAWINGS

Referring to the accompanying drawings, wherein is shown one but obviously not necessarily an only form of embodiment of the invention;

FIG. 1 is a partly diagrammatic view in vertical section of a projector in accordance with the illustrated embodiment of the invention, the sectional view being taken substantially along the line 1—1 of FIG. 2;

FIG. 2 is a fragmentary view in horizontal section taken substantially along the line 2—2 of FIG. 1;

FIG. 3 is a partly diagrammatic view in perspective of projector apparatus in accordance with the illustrated embodiment of the invention, certain of the structural elements being omitted for clarity;

FIG. 4 is a view in cross section taken substantially along the line 4—4 of FIG. 1;

DESCRIPTION OF A PREFERRED METHOD AND EMBODIMENT

Figure 5:
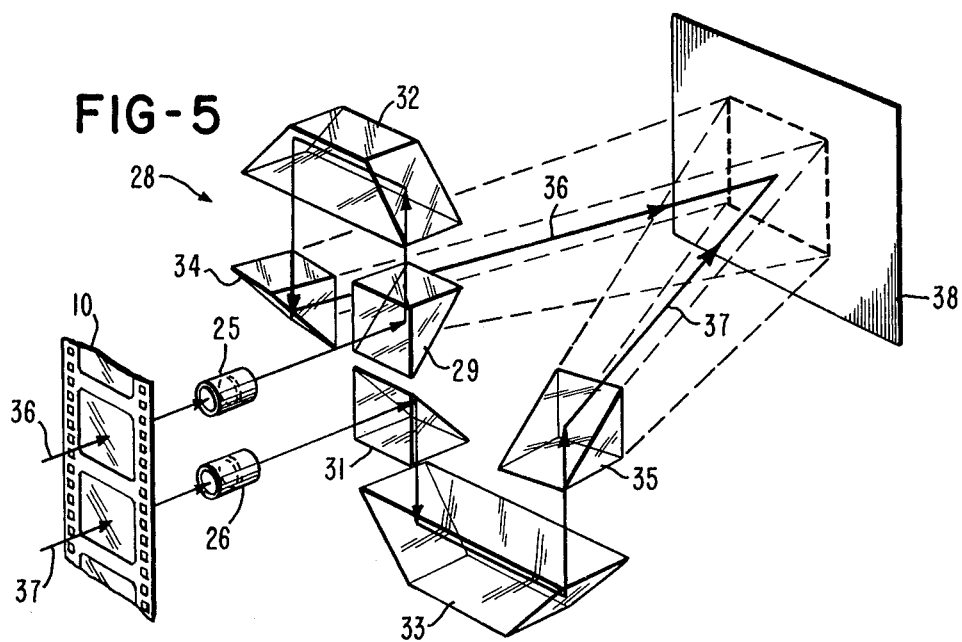
FIG. 5 is a fragmentary view in perspective, showing lens and prism elements.

The projection system disclosed operates in connection with a film strip having separate right and left eye images of a single picture recorded in successive, adjacent locations on a film strip, as on successive frame portions thereof. A method of and means to achieve such recording is disclosed in U.S. Pat. No. 3,019,698 issued Feb. 6, 1962 to Stewart L. Sheldon, and reference is made to that patent for a disclosure of background information not specifically contained herein. In one aspect thereof the present invention may be regarded as disclosing a method and apparatus substituting for or improving upon the projection system of the identified patent.

In the patented recording process, an image "seen" by a right eye camera lens is recorded on one frame of a film strip 10 while the image seen by a left eye camera lens is simultaneously recorded on the next adjacent film frame. A system of lenses and prisms is used to effect the desired recording. The instant invention is concerned with projection of right and left eye images on successive film frames broadly, whatever may be the recording process.

Referring to the drawings, a film strip 10 containing a succession of pre-recorded right and left eye images feeds into a projector housing 11 where it is guided by a sprocket wheel 12 to pass in front of an apertured plate or gate 13. Vertically spaced apart apertures 14 and 15 are provided in the gate 13 to respectively expose an adjacent pair of prerecorded right and left eye images of a scene. Beyond gate 13 the film strip 10 is engaged by sprocket wheels 16 and 16' to be guided thereby out of the projector housing. The sprocket wheels 12, 16 and 16' are each fixed to a rotatable shaft, 18, 22 and 18' respectively, and commonly and simultaneously driven by a drive motor 17 through conventional means including an intermittent drive mechanism which is suitably modified to provide for a film pull down of two frames at a time in the gate 13. These two frames will have respectively the right and left eye image of the same scene as noted above. Since the details of the intermittent drive mechanism are generally conventional and can be effected by a mechanic versed in the art, including their modification to provide for a double frame pull down, the same is not further shown or described.

Thus, in the practice of the present invention, the film sprocket wheels are utilized to move the film strip through the gate and to effect a dwell within the gate, on each pull down of the film strip, of a set of images corresponding to the right and left eye image of the same view. As illustrated, the left eye image will register, in pull down, with the aperture 14 while the right eye image will register with the aperture 15.

Now looking further to the diagrammatic showing in FIG. 2 of the drawings, the drive shaft of the motor 17 has coupled thereto a shaft element forming an extension 18 which enters the projector housing 11 to mount thereon the aforementioned sprocket 12. Fixed for rotation with the shaft extension 18 within the housing 11 is a pulley 59 the purpose of which will be further described.

The housing 11 has a base portion 23 and an upwardly projecting front wall 24. In the wall 24 is positioned a pair of lens assemblies 25 and 26 aligning with the apertures 14 and 15 in the gate 13. Projecting from the front wall 24 in a generally surrounding relation to the lens assemblies 25 and 26 is a sub-housing 27 suitably mounting a prism assembly 28. The assembly 28 includes a pair of prisms 29 and 31 in end to end relation and aligning with respective lens assemblies 25 and 26. Above prism 29 is a laterally deflecting prism 32 while below prism 31 is a similar laterally deflecting prism 33. Below prism 32 is a left eye image projecting prism 34. Above prism 33 is a right eye projecting image prism 35. The arrangement places the prisms 34 and 35 in substantially parallel laterally spaced apart relation, the spacing being of a selected character determined to produce maximum three dimensional effects. The flow of projected images is substantially as indicated by the directional arrows 36 and 37 in FIG. 5. Thus, a source of light contained in the projector housing passes through the apertures 14 and 15 in the gate 13 and through aligned right eye and left eye recorded images on the film strip. Passing through the recorded images and projecting them through lens assemblies 25 and 26, a left eye image is reflected by prism 29 through prism 32 and on to projecting prism 34 where it is in turn reflected forwardly towards a viewing surface 38. Similarly, a right eye image is deflected by prism 31 through prism 33 upon prism 35 to be from there cast towards the viewing surface 38. The projecting prisms 34 and 35 are suitably angularly disposed to cause the respective left eye and right eye images to be projected in superimposed relation towards the surface 38. It will be understood that the sub-housing 27 or other supporting means for the prism assembly 28 may be rendered capable of axial adjustment for focusing purposes.

The method and apparatus of the invention accordingly provides a lens and prism arrangement by which different eye images on successive portions of a film strip may be projected from laterally spaced locations into a superimposing position on a viewing surface. The invention further provides shutter means interposing beyong the arrangement of prisms in the respective paths of projection of the right and left eye images.

As diagrammatically shown, a front edge of the projector housing base 23 is extended and turned upward to define a mounting wall 39. On the upper edge of wall 39 are laterally spaced apart bearing hubs 41 and 42 in which are rotatably mounted respective shafts 43 and 44. There is releasably secured to shaft 43, on an inward side of wall 39, a disc 45. Releasably secured to shaft 44 and positioned in correspondence with disc 45 to be in substantially the same lateral plane is a disc 46. Portions of the respective discs lie in front of the prisms 34 and 35 in position to block the images projected therefrom. In disc 45 is an aperture 47 occupying a substantial radial part of the disc and approximately 8° of the circumferential area thereof. In the disc 46 is a similar aperture 48 which, however, occupies about 75° of its circumferential area. The discs may be variously constructed, as for example, by being made of an opaque material with apertures 47 and 48 physically cut therefrom. For better balance the discs may preferably be made of a transparent material such as plexiglass. One complete face of the disc is coated with an opaque paint except for a segmental area corresponding to the aperture 47 or the aperture 48. The uncoated area forms an effective opening through the disc for the passage of a light image.

The discs 45 and 46 are rotatably mounted through their shafts 43 and 44 in the bearing hubs 41 and 42. They act as shutters, variously permitting and denying the passage of light images which the prisms 34 and 35 attempt to project upon the viewing surface 38. On the shaft 43 is a pulley 49 and on the shaft 44 is a pulley 51. These pulleys 49 and 51 are embraced in a driving relation by respective belts 52 and 52' which respectively extend also over dual driving pulleys 53 and 54. An interconnecting belt 50 compels a common rotation of pulleys 53 and 54. The pulleys 53 and 54 are mounted in a side by side relation on shafts which bear in the wall 39. In one case the driving pulley 53 is made fast to its shaft 56 which is rotatably driven through mating bevel gears 57 from a pulley 58. The latter forms part of a drive train further including the pulley 59 on the motor shaft 18 to which it is connected by a continuous belt 61. Operation of the motor 17 accordingly effects rotary motion of the shaft 56 and drive of the pulley 53, effecting, through the belt 50, a unison, corresponding rotary drive of the shutter shafts 43 and 44.

Figure 7:
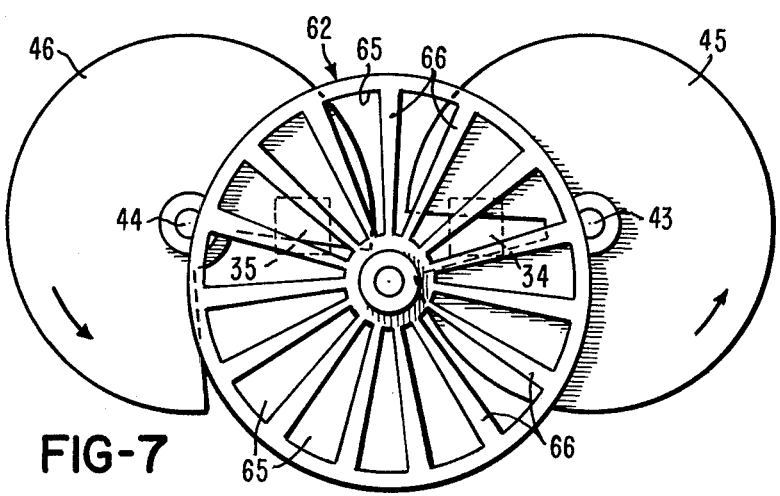
FIG. 7 is a fragmentary view in front end elevation, showing principally the shutter devices.

Further comprised in the shutter mechanism is a shutter disc 62 disposing substantially parallel to the discs 45 and 46 but on the opposite side or outwardly of wall 39. The disc 62 is releasably secured to a shaft 63 projecting outwardly from a hub 64 mounted on the front face of wall 39. Shaft 63 positions substantially midway between the shafts 43 and 44 and disposes disc 62 so as to cyclically overlap both apertured areas of the shutter discs 45 and 46. A projected image passing through either aperture 47 or 48 of what may be considered primary shutter means 45–46 is thus further required to pass through the disc 62 prior to reaching the viewing surface 38. An annular portion of the disc 62 is apertured, as shown in FIG. 7, there being provided therein a circumferential series of radially elongated segmental openings or clear areas 65. The openings 65 are uniformly spaced apart and relatively narrow, being separated by opaque spokes 66. Rotation of the disc 62 in the paths of projection of the right and left eye images produces a relatively high frequency interruption of such projections. The disc 62 is or may be constructed like the discs 45 and 46. Thus, it may be made of a transparent material coated on one side except for spaced segmental areas corresponding to the apertures 65. Mounting shaft 63 has a pulley 67 thereon. A belt 68 is in encompassing relation to the pulley 67 and to a pulley 69 on the driven shaft 56, as well as to an idler pulley 60. Accordingly, the rotation of shaft 56, which causes rotary motion of the discs 45 and 46, is effective simultaneously to rotate the disc 62 in precisely timed relation.

The shutter discs, and particularly the discs 45 and 46 are attached to their respective mounting shafts for relative rotary or angular adjustment. This may be conveniently accomplished by giving each shutter disc a screw threaded mounting on its respective shaft and utilizing lock nuts to fix the discs in selected positions of angular adjustment about the shaft as an axis.

Figure 6:
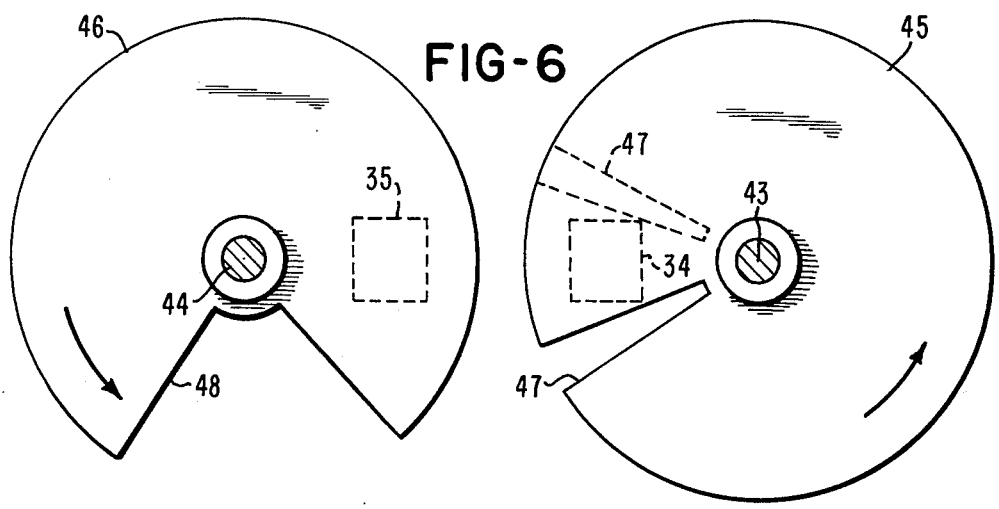
FIG. 6 is a view in cross section, taken substantially along the line 6—6 of FIG. 1.

In the illustrated embodiment of the invention certain relative angular positions of the shutter discs, the location and degree of their portions which pass light, and certain aperture sizes have been found to produce advantageous results. It is not intended, however, to exclude variations thereof for certain applications, which variations might also produce advantageous results and the employment of which is within the scope of the present invention. In the present instance, in the initial adjustment of the parts, the disc 45 is rotatably turned on its shaft 43 until the aperture or opening 47 therein is immediately above left eye prism 34 or in a position substantially as shown in dotted lines in FIG. 6. The normal direction of rotation of disc 45 being counterclockwise as shown in FIG. 6, this initial positioning of the disc locates the aperture 47 in a position it assumes immediately prior to beginning to pass in front of the prism 34. The disc 45 is then locked in adjusted position. The full drive train is then activated, by hand movement, to advance the disc 45 until aperture 47 therein has moved to and approximately 30° beyond the full line position shown in FIG. 6. Following this, shutter disc 46 is angularly turned on its shaft 44 until aperture 48 occupies a position just prior to its movement across prism 35, the direction of movement of the disc 46 being counterclockwise as viewed in FIG. 6. The disc is locked in this position. Shutter disc 62 is then locked to its shaft 63. A fine tuning adjustment of this disc is later effected to achieve maximal three dimensional interpretation of the projected images. This is accomplished by a test projection of the film to be shown and merely involves, if required, a slight rotational adjustment of the disc 62 and its apertures in reference to the respective positions established for the openings in the discs forming the shutters 45 and 46. It will be understood, of course, that the invention also comprehends an arrangement in which the pattern of apertures 65 will occupy only a part of the circumference of the disc 62, in which case the disc 62 will be initially set by test to achieve a maximum cooperative relation with the primary shutter disc openings 47 and 48.

The size of the apertures in the several shutter discs and the angular relationship of said apertures contribute to a projection of a mating pair of left and right eye images on the viewing surface 38 in a time spaced relation and with the left and right eye images being differentially projected as to the extent of the scene which is imprinted thereon. Contributing to the unique depth of the images projected on the viewing surface 38 is the synchronous drive of the shutters 45 and 46 with their differentially sized and relatively displaced openings, the timed and common drive of the film feed mechanism and the simultaneous drive of the blending disc shutter 62. The latter is not only provided with numerous relatively small viewing openings but is driven at a speed which is a multiple of the speeds at which the shutters 45 and 46 are driven. The shutters 45 and 46 in turn are driven at a speed which is a multiple of that of the drive motor common to the various elements described. For example, in one embodiment in application of the invention the shutter discs 45 and 46 have been arranged to provide a speed of rotation which is substantially uniform and at a rate which is approximately a 2 to 1 ratio to the speed of rotation of the motor shaft 18. Simultaneously the shutter 62 was turned at a greater speed than the shutters 45 and 46, which speed was a 2.17 multiple of the speed of rotation of the shutters 45 and 46. The net effect achieved with the arrangement of the various components described and their relative operation as described was an unusual and unique depth of the image appearing on the viewing surface so as to achieve a three dimensional effect not heretofore deemed possible.

It is to be kept in mind that an essential aspect of the practice of the invention is that in the contemplated functioning and arrangement of the parts there will be positioned in the gate 13 successive pairs of film frames one of which is a left eye image of the scene to be projected and the other a right eye image of the same scene. These scenes are respectively aligned with the gate apertures 14 and 15. During the dwell of the two frames in the gate the shutter discs 45 and 46 will be driven at a speed as to complete two full revolutions in the case of the example noted. Of course, it will be understood the stepped up speed of rotation and relative rotation of the shutter discs may be accomplished in any convenient manner, as for example by the differential diameter of the pulleys 59 and 58 as shown in FIG. 3. During the noted two full revolutions, each of the left and the right eye images will be projected twice and in alternating relation. Note further that by the described circumferential displacement of the images a particular time spaced relation between the projections will be effected. Additionally, while the right eye shutter disc 46 with its larger opening will during projection be capable of projecting a full image of the frame which it passes, the relatively closed down opening in the shutter disc 45 will pass only definitive sections of the frame with which it relates, the sections passed changing as the opening moves across the related image of the frame embodying the left eye image. Thus, when the images from the respective frames are projected they are projected in time spaced and superposing relation with differentially sized portions of the frames being projected to superpose in any one instant if they should reach the viewing screen. Absent the shutter 62, which may be omitted under certain cases of application of the invention, we then find, with the four images transmitted, a layered effect of the images, creating a considerable sense of depth in what the eye observes. Due to the fact shutter 47 transmits only fragments of the image there is a constant shading of the apparently superposed images which enhances the three dimensional effect presented to the viewer. It is to be understood that there has been no clear mathematical theory developed as to how and why the effect occurs. However, the effect does nevertheless occur as indicated. With the additional use of the shutter 62 with its plurality of small openings and intervening spokes being moved to intercept the images passed through the shutters 45 and 46, the net result is a further blending of the images as observed on the viewing surface which they reach. The shutter 62 operates somewhat like a blinking eyelid so that, in the projection of a double set of images by the shutters 45 and 46, during an instance of dwell of a pair of frames in the gate 13, the shutter 62 moving at a greater speed will in effect multiply the number of exposures of the projected images passed by shutters 45 and 46, and reduce the time period thereof as it intercepts the same as they are directed towards the viewing surface. As noted, no comprehensible explanation has been able to be developed as to the reasons behind the unusual three dimensional effect in use of the invention. But the various compositions and relation of the shutter constructions described (the elements 45 and 46 alone or together with the shutter 62), with a relative differential in their speed of rotation and in the sizes of their apertures which pass image portions, cause a blending together of image portions to achieve the described end result.

In summary, in the operation of the described system, a film strip will be maintained in the projector housing in a cooperative relation with the guide sprockets 12, 16 and 16' and the latter will be driven to intermittently position in the gate 13 a set of right and left eye images respectively aligning with the apertures 14 and 15. With the shutter discs 45 and 46 properly angularly positioned in the first instance as described, the drive motor once energized will continue to serve a driving function while effecting through suitable intervening mechanism the intermittent feeding of the film. With the continuous drive of the motor, there is a synchronous drive of the discs 45 and 46 with a set of images in a dwell position in the gate 13, the respective differentially sized openings in the shutters 45 and 46 transmitting during the dwell period first one then another set of images of differential scope which tend to converge into superposing patterns directed toward the viewing surface 38. With these projected images intercepted by the shutter 62, the latter of which rotates more than twice as fast as the shutter discs 45 and 46 in the example mentioned, the images as passed to the viewing surface will be further time spaced and superposed and being differentialy sized will blend in an image which is shaded and endowed with a considerable depth, as far as the eye can observe. While there is no theoretical explanation for what the eye observes, it is believed with the brief burst of light with respect to the left and right eye images transmitted from the projector, which bursts are segmented beyond the projector, it is the same as building up a layer of pictures. By reason of the differential size of the left and right eye projections this layered image is further caused to have a shading contributing to the unusual imagery.

Thus, the alternating, repetitive and differential character of the projected eye images has been found to provide a time and space dimensional variation of the resultant composite which expresses itself to a viewer as a true three dimensional picture.

As noted previously, there are instances where the shutter disc 62 may not be required for the quality necessary in the end product. However, it does in its use achieve a blending and softening result, distinctly improving the depth and clarity of the picture observed on the viewing surface.

Structural modification in the disclosed apparatus may be considerable without departing from the spirit and concept of the invention. The camera structure per se and the supports provided for the relative elements essential to practice the invention have been merely presented in a diagrammatic form and the same may be embodied in any manner best suited for the projector and its application. The application of the invention will from the foregoing be simple to understand by one versed in the art. Of course, the direction of rotation of the shutters 45 and 46 could be reversed or made to rotate in opposite directions, it merely being required that the shutters be initially angularly set to accomplish the desired relation of the exposure effected thereby. Also, as is obvious, the lens assemblies 25 and 26 might be placed beyond the prism assembly, particularly if the added convenience lends adjustment or replacement should be required. There also will obviously be variations in the size and location of the shutter apertures and variations in the speed of ratios mentioned by way of example. These changes are all possible without departing from the spirit of the disclosed invention. The particular need can be readily determined from the foregoing and the same should be possible to effect by mechanics in the art with the foregoing before them.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described our invention, we claim:

1. Projector apparatus embodying a film gate and means for moving film through said gate in intermittent fashion to simultaneously present at said gate right and left eye images of a scene provided in succession on the film, characterized by means for differentially projecting said right and left eye images toward a viewing surface in time spaced superposing relation, said last named means including a pair of rotatable disc shutters, one in the path of each projected right and left eye image, apertures in respective shutters being differentially located in a circumferential sense, the aperture in one of said pair of shutters providing for greater angular exposure than the aperture of the other of said pair of shutters for a projection of differential increments of right and left eye images in time spaced superposing relation and said means for differentially projecting right and left eye images further including a rotatable disc shutter common to projected right and left eye images and comprising a plurality of uniformly spaced apertures in annular arrangement.

2. Projection apparatus as in claim 1, wherein said rotatable disc shutter common to projected right and left eye images is located beyond said pair of shutters having regard to the direction of projected images and is rotated more rapidly than said pair of shutters.

3. A photographic system for achieving three dimensional projection, including means for advancing successive portions of a film to a projecting position, each successive film portion containing right and left eye recorded images in a separated adjacent relation, means for projecting positioned images in substantially parallel spaced apart relation and directing such images in a substantially superimposing relation upon a viewing surface, a shutter rotating through the path of each projected image and having an opening therein permitting passage of the projected image therethrough during a portion only of each shutter revolution, the openings in respective shutters being circumferentially offset for passage of right and left eye images in timed spaced relation and said openings being of differential size, said projecting means including a pair of spaced apart prisms through which said right and left eye images are respectively transmitted, said shutters being arranged beyond said prisms in position to cause the openings therein to intersect projected images, and a third rotating shutter beyond said previously mentioned shutters having a continuous annular series of uniformly spaced apart openings therein in commonly intersecting relation to images projected through and beyond said previously mentioned shutters.

4. A system according to claim 3, wherein the means for advancing successive film portions to projecting position includes means intermittently to advance the film with successive portions remaining for set intervals at projecting position, characterized in that said shutters are rotated by said advancing means in a synchronous timed relation to advance of said film with the first said shutters rotating through multiple revolutions during each set interval in the advance of the film and the third said shutter rotating more rapidly than the first said shutter.

5. A photographic method enabling three dimensional projections from a film having right and left eye images separately recorded thereon as a series of sets of right and left eye images, including the steps of bringing each set, successively, to a projecting position, projecting said right and left eye images of each set in spaced apart relation and directing said images toward a viewing surface in a substantially superimposing relation, each right and left eye image of a set being directed toward the viewing surface a plurality of times while said set is at a projecting position, controlling projection of said images so that said right and left eye images are directed toward the viewing surface in a following relation to one another and in differential increments and imposing on the directed right and left eye images a high frequency interruption by rotating a shutter in the path thereof which provides an annular surface toward which both the right and left eye images are projected, said annular surface being comprised of regularly interrupted open portions through which the projected images are passed, said high frequency interruption being arranged to achieve in conjunction with the first mentioned control of the projection of said images a layering of images and portions thereof productive of depth effects in a picture as seen on the viewing surface.

* * * * *

UNITED STATES PATENT AND TRADEMARK OFFICE
CERTIFICATE OF CORRECTION

PATENT NO. : 3,963,332
DATED : June 15, 1976
INVENTOR(S) : Stewart L. Sheldon; Wilbur R. Horstman; and Robert G. Gump It is certified that error appears in the above-identified patent and that said Letters Patent are hereby corrected as shown below:

Col. 1, line 67, -- being -- is inserted following "shutters".

Col. 4, line 4, "beyong" is corrected to read -- beyond --;

line 43, "the" is inserted following "In"

Col. 5, line 49, -- 46 -- is inserted following "disc". (first occurrence).

Col. 7, line 51, "differentialy" is corrected to read -- differentially --.

Col. 10, line 7, "shutter" is corrected to read -- shutters --.

Signed and Sealed this

Fourteenth Day of September 1976

[SEAL]

Attest:

RUTH C. MASON
Attesting Officer

C. MARSHALL DANN
Commissioner of Patents and Trademarks